Patented Sept. 19, 1933

1,927,027

UNITED STATES PATENT OFFICE 1,927,027

METHOD OF PREVENTING THE FORMATION OF SCALE IN BOILERS AND THE LIKE

William C. Foulds, Philadelphia, Pa., assignor of one-half to Dissociators Inc., Philadelphia, Pa., a corporation of Delaware, and one-half to William H. Betz and L. Drew Betz, a partnership trading as W. H. and L. D. Betz, Philadelphia, Pa.

No Drawing. Application February 13, 1929
Serial No. 339,744

2 Claims. (Cl. 87—27)

My invention relates to a new and useful method of preventing the formation of scale in boilers and the like in an effective, easy, and inexpensive manner.

As is well known, ordinary feed water usually contains varying amounts of inorganic salts in suspension or in solution, which, when heated, are changed through catalysis and combination into encrusting precipitates or deposits which fuse and adhere to the inside surfaces of the boiler, forming what is commonly known as boiler scale.

To overcome this disadvantage, it has heretofore been the practice to introduce into the boiler water various additional compounds which would combine with the salts and other substances contained in the water to form still other compounds which are insoluble and among which no further combination can take place. To accomplish this result it is necessary to add the various compounds employed in relatively large quantities, that is, in quantities which in volume, weight, chemical activity, or valence are substantially equal to the quantities of the various substances suspended or dissolved in the boiler water. Thus, in the case of feed water taken in the vicinity of the city of Philadelphia, which has been found by analysis to contain eighty-eight parts per million of encrusting solids in solution or suspension which under heat are precipitated or deposited to form boiler scale, a boiler of 20,000 gal. daily capacity will contain approximately 6,600 grams of potential encrusting substances, to prevent the precipitation or deposit of which it would be necessary to add approximately the same amount of the various compounds possessing the desired chemical characteristics and activity. Aside from the expense involved, the addition of the necessary compounds to the boiler water increases the density of the water, thus raising its boiling point and decreasing the efficiency in terms of steam production as is well known.

It is therefore the object of my invention to provide a novel method of preventing the formation of scale in boilers by preventing the precipitation of the solid encrusting substances dissolved or suspended therein without the necessity of adding large quantities of compounds to combine with said substances, thus greatly reducing the expense of operation, and not in any way interfering with the steam producing efficiency of the boiler.

To the above ends, my invention consists in introducing, at suitable intervals, very small quantities of a colloidal metal into the boiler, which, I have found by careful tests, analysis and experiment, effectively prevents the deposit and precipitation of encrusting substances from the boiler water, effectively to prevent the formation of scale, and while I am about to disclose and claim one form or method of carrying out my invention which is at present preferred by me since it has given very satisfactory results, it is to be understood that the same may be varied in various particulars without departing from the spirit or scope of my invention or sacrificing any of its advantages, since my invention consists, broadly, in the discovery that a very small quantity of colloidal metal is sufficient effectively to prevent the formation of scale in boilers of relatively large capacity.

In the preferred form of my invention, I introduce, at suitable intervals, about six grams of colloidal iron into a boiler of about 20,000 gal. daily capacity, which, as above pointed out, if operated in the vicinity of the city of Philadelphia will contain about 6,600 grams of encrusting soluble matter, and which, if treated according to the methods heretofore in vogue, would require about 6,600 grams, more or less, of various compounds to combine with and prevent the deposit and precipitation of said encrusting substances. It will thus be seen that the addition of six grams of colloidal iron instead of approximately 6,600 grams which would be necessary if other compounds are used not only reduces the expense to a minimum, but will also not affect the density of the boiler water and will therefore not decrease its steam producing efficiency. From the great disproportion of the practically negligible amount of colloidal iron introduced into the boiler water as compared with the amount of potential encrusting substances found therein, it is safe to infer that the action involved is probably not purely chemical, that is, the six grams of colloidal iron are not sufficient chemically to combine with 6,600 grams of any other substances, and the fact that this small amount of colloidal iron does effectively prevent precipitation of such substances leads me to believe that the action is probably wholly catalytic or partly catalytic and partly electro-chemical. I am aware of the prior use of iron, in the form of sheet metal, or iron borings and turnings in boilers and hot water systems for the purpose of absorbing dissolved gases, principally oxygen and carbon dioxide, to prevent the formation of metal corroding acids, but my invention is differentiated therefrom since by the use of colloidal iron I directly affect the encrusting substances dissolved or suspended in the boiler water to prevent the precipitation and deposit thereof to prevent the formation of scale.

One method of preparing colloidal iron as used according to the prevent invention is the electrical method, which comprises the use of the electric arc, which passing between two pieces of metallic iron under water, produces the microscopic atomization of the metal, resulting in a colloidal solution (so called) or hydrosol of the iron.

As a result of thus constantly maintaining the solid substances in solution and suspension and the continuous evaporation of the water in the boiler, the density of the water is inevitably increased, which defect is remedied by the conventional process of a "blow-down" which consists in draining the heavier water in the bottom of the boiler and adding fresh water to replace the quantity thus drained or evaporated, but it will be obvious that by my novel means and method which does not, per se, add to or increase the density of the boiler water, such blow downs are necessarily less frequent and less extensive.

It will further be seen that by the use of my novel method, the prevention of scale formation is effectively accomplished without any interruption of the serviceability of the boiler.

Having thus described my invention, what I claim as new, and desire to secure by Letters Patent, is:

1. The method of preventing the formation of scale within a boiler, which consists in adding colloidal metallic iron to the boiler water.

2. The method of preventing the formation of scale within a boiler which consists in adding colloidal metallic iron to the water boiler in the proportion of approximately six grams of colloidal metallic iron to a boiler of 20,000 gallons daily capacity.

WILLIAM C. FOULDS.

DISCLAIMER 1,927,027.—*William C. Foulds*, Philadelphia, Pa. METHOD OF PREVENTING THE FORMATION OF SCALE IN BOILERS AND THE LIKE. Patent dated September 19, 1933. Disclaimer filed February 7, 1938, by the assignee, *Allis-Chalmers Manufacturing Company*.

Hereby enters this disclaimer to claim 1 in its entirety, in said specification; and to claim 2 except insofar as it includes adding the colloidal metallic iron to the boiler water in the proportion of approximately six grams of colloidal metallic iron per 20,000 gallons of water to be evaporated, where the water contains approximately 6,600 grams of encrusting substances per 20,000 gallons of water.

[*Official Gazette March 8, 1938.*]

use of colloidal iron I directly affect the encrusting substances dissolved or suspended in the boiler water to prevent the precipitation and deposit thereof to prevent the formation of scale.

One method of preparing colloidal iron as used according to the prevent invention is the electrical method, which comprises the use of the electric arc, which passing between two pieces of metallic iron under water, produces the microscopic atomization of the metal, resulting in a colloidal solution (so called) or hydrosol of the iron.

As a result of thus constantly maintaining the solid substances in solution and suspension and the continuous evaporation of the water in the boiler, the density of the water is inevitably increased, which defect is remedied by the conventional process of a "blow-down" which consists in draining the heavier water in the bottom of the boiler and adding fresh water to replace the quantity thus drained or evaporated, but it will be obvious that by my novel means and method which does not, per se, add to or increase the density of the boiler water, such blow downs are necessarily less frequent and less extensive.

It will further be seen that by the use of my novel method, the prevention of scale formation is effectively accomplished without any interruption of the serviceability of the boiler.

Having thus described my invention, what I claim as new, and desire to secure by Letters Patent, is:

1. The method of preventing the formation of scale within a boiler, which consists in adding colloidal metallic iron to the boiler water.

2. The method of preventing the formation of scale within a boiler which consists in adding colloidal metallic iron to the water boiler in the proportion of approximately six grams of colloidal metallic iron to a boiler of 20,000 gallons daily capacity.

WILLIAM C. FOULDS.

DISCLAIMER 1,927,027.—*William C. Foulds*, Philadelphia, Pa. METHOD OF PREVENTING THE FORMATION OF SCALE IN BOILERS AND THE LIKE. Patent dated September 19, 1933. Disclaimer filed February 7, 1938, by the assignee, *Allis-Chalmers Manufacturing Company*.

Hereby enters this disclaimer to claim 1 in its entirety, in said specification; and to claim 2 except insofar as it includes adding the colloidal metallic iron to the boiler water in the proportion of approximately six grams of colloidal metallic iron per 20,000 gallons of water to be evaporated, where the water contains approximately 6,600 grams of encrusting substances per 20,000 gallons of water.

[*Official Gazette March 8, 1938.*]

DISCLAIMER 1,927,027.—*William C. Foulds*, Philadelphia, Pa. METHOD OF PREVENTING THE FORMATION OF SCALE IN BOILERS AND THE LIKE. Patent dated September 19, 1933. Disclaimer filed February 7, 1938, by the assignee, *Allis-Chalmers Manufacturing Company*.

Hereby enters this disclaimer to claim 1 in its entirety, in said specification; and to claim 2 except insofar as it includes adding the colloidal metallic iron to the boiler water in the proportion of approximately six grams of colloidal metallic iron per 20,000 gallons of water to be evaporated, where the water contains approximately 6,600 grams of encrusting substances per 20,000 gallons of water.

[*Official Gazette March 8, 1938.*]